A. P. WHITE.
BUILDING MATERIAL.
APPLICATION FILED AUG. 7, 1911.
1,049,630.
Patented Jan. 7, 1913.
2 SHEETS—SHEET 2.
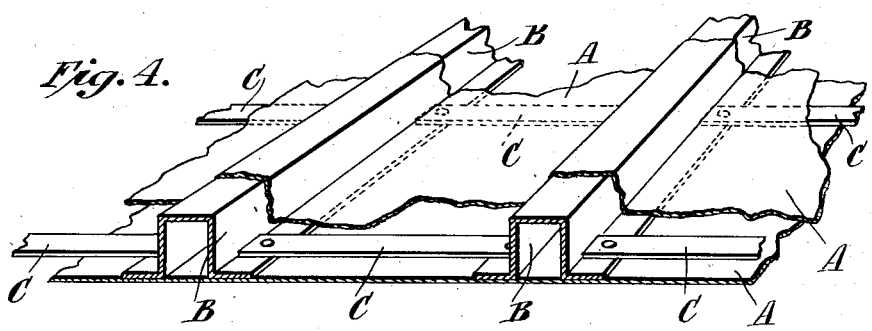
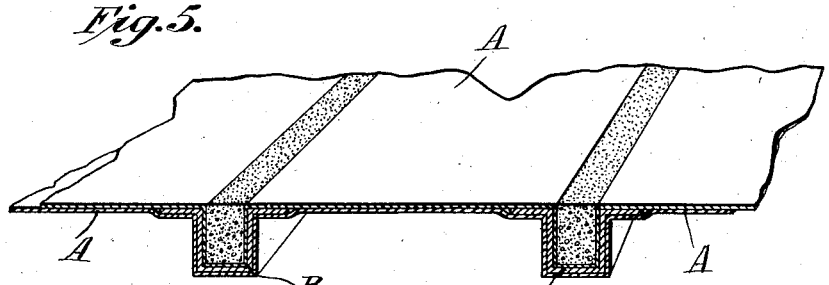
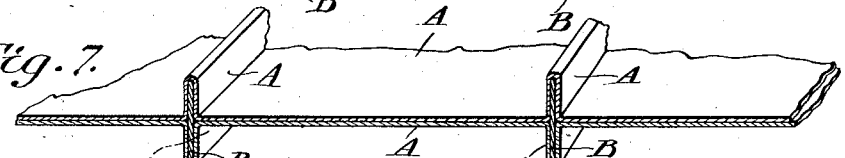
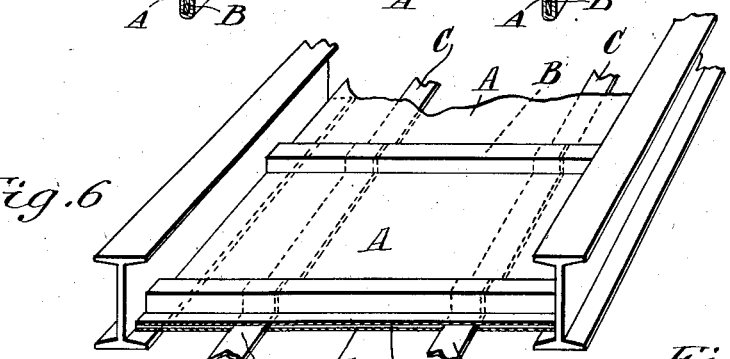
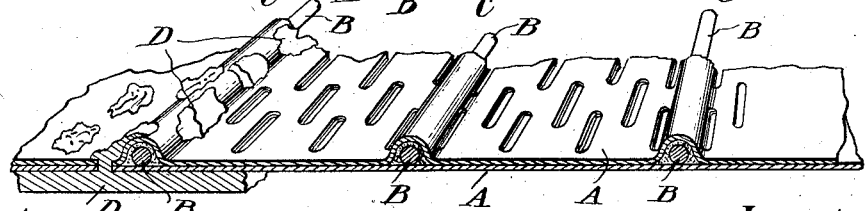
Attest:
Inventor,

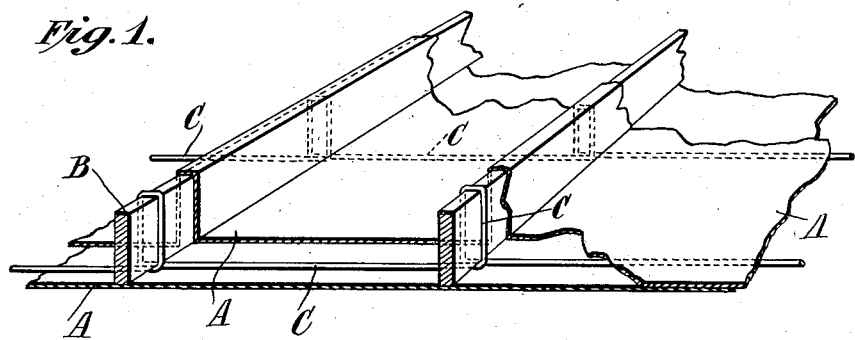
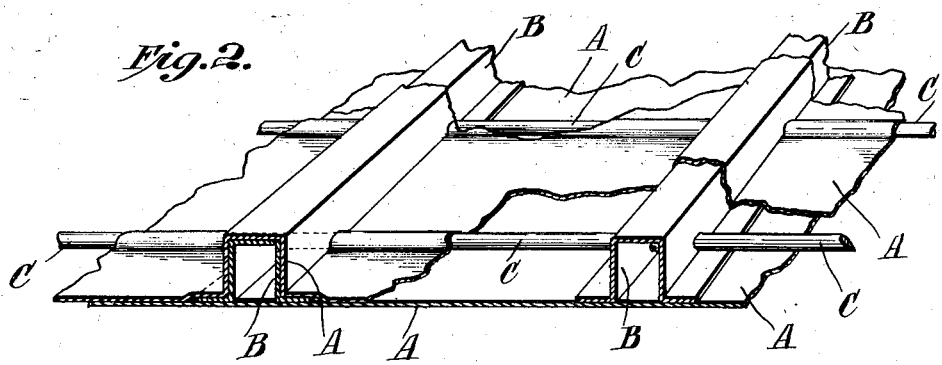
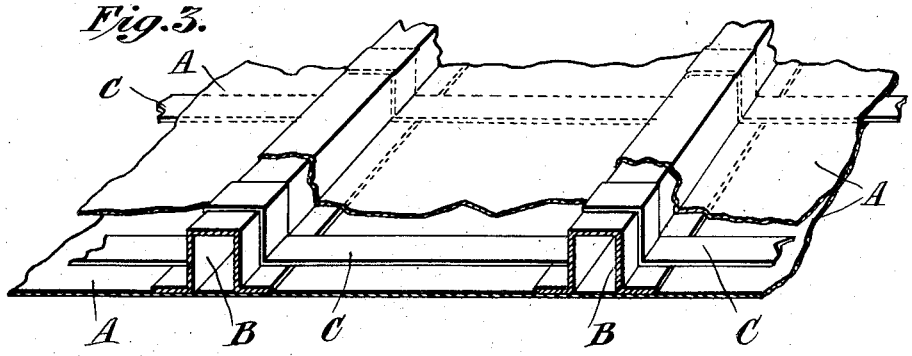

UNITED STATES PATENT OFFICE.

ALEXANDER P. WHITE, OF CALDWELL, NEW JERSEY.

BUILDING MATERIAL.

1,049,630. Specification of Letters Patent. Patented Jan. 7, 1913.

Application filed August 7, 1911. Serial No. 642,842.

*To all whom it may concern:*

Be it known that I, ALEXANDER P. WHITE, a citizen of the United States, residing in Caldwell, county of Essex, State of New Jersey, have invented a new and useful Improvement in Building Material.

My invention relates to a new material suitable for different uses in building construction, more particularly for lathing, and for forming walls, floors, partitions and other structural parts.

The object is to simplify, improve and cheapen such construction, by providing a new and composite material which can be formed or produced in certain shapes, easily transported and readily adapted to be put in position without special skill.

Briefly stated, it consists in effecting a combination of artificial stone, paper and metal to make certain structural parts.

The present application is in part related to my pending application, filed April 8, 1910, Serial Number 554,168.

In the several illustrations which are a part of this specification, I show different forms useful in building construction, in which the stone metal and paper can be combined.

Like reference letters in different figures refer to corresponding parts.

A, refers to the stone and paper composition, B, to the main metallic members, and C, to minor metallic members.

Figure 1 shows in combination with the paper and stone a main metallic member B adapted to serve as reinforcement for concrete. C represents a metallic rod used as a brace. Fig. 2 shows the main member B in the form of a flanged channel, with rods C passing through holes in the channel above the flanges. Fig. 3 shows merely a different form of brace C. Fig. 4 shows still another form of brace C. Fig. 5 shows the channel members A left open at their flanged base, the groove being filled with concrete, illustrating how the groove may be used when not covered by the composite material. Fig. 6 shows the design represented by Fig. 3 resting on the flanges of I beams, ready for the concrete to be poured in to form a floor. Fig. 7 shows still another design in which the reinforcing member B extends beyond both surfaces of the stone and paper portion. Fig. 8 shows a form particularly adapted for lathing the metallic elements being relatively smaller than those shown in other figures, and consisting of rods of steel. The letter D in this figure represents plaster as applied.

Metallic fabrics, formed by weaving and interlocking wires, and by slitting sheet metal and drawing apart the slitted portions, are now extensively used for lathing, but in these articles, it is difficult to dispose or distribute the metal, so as to obtain the greatest efficiency. In order to provide meshes which will retain the plaster, it is necessary to place the strands close together and, on this account, it is not practical to make the strands thick and heavy, else the fabric will be costly and difficult to manipulate. When, however, the strands are of small diameter the fabric is not stiff and the strands "cut" the plaster, allowing much of it to go behind the lath, and causing waste. Therefore, great care in its application is necessary. Also on account of the resilient character of these metallic fabrics, precaution is required to prevent them throwing off the plaster in one place, when the pressure of the trowel is applied in another place. Moreover, the metal of the expanded sheet and woven wire fabrics is liable to rust and this fact constitutes a serious objection. Still, because of the negligible contraction and expansion of steel, and, because of its non-inflammable character, it is greatly preferred for lathing, to wood which warps and twists as it absorbs moisture. Plaster boards, made by forming plaster in slabs, are also extensively used. These are heavy and fragile, and difficult and costly, to transport, and they are not desirable for high class construction. When placed in position they are covered with plaster but this covering is simply a finish. The plaster board itself constituting the actual wall body, the coating is liable to crack and spale. When, however, the substantial portion of the wall is formed in place, by applying plaster to lathing, the wall is practically homogeneous, and this method is preferred in high class construction. The coefficient of contraction and expansion of steel and ordinary plaster compounds being about the same, steel is highly desirable for reinforcement, but, as already noted, when the close strands are made heavy enough, to become factors of strength, it is costly.

My invention overcomes the objections set forth. It provides a means of producing a homogeneous wall body that allows an economical distribution of the metal, to supply the desired reinforcing element in substantial weight or size, and, at the same time, it safeguards the metal from rust. This result is achieved at a cost materially less than the cost of any thing now used for the same purpose.

In carrying out the invention, to produce a form for lathing, I select rods of metal, preferably steel of suitable thickness, say 3/16 of an inch in diameter. I also select two sheets of strong paper of suitable porosity, say a little more than 1/64 of an inch in thickness. In one of the sheets, I form grooves or channels, say 3 inches apart and which grooves or channels produce stiffening ribs along the fibrous body sheet. I immerse, soak or otherwise treat the paper sheets, in a liquid form of artificial stone, thus to combine the stone and paper by impregnation. I then place the sheet containing the rib-forming grooves on the bed plate of a press, the bed plate having grooves coinciding with the grooves in the paper. I next place the reinforcing metallic rods or wires in the grooves, bring the second sheet into position on the grooved sheet, and subject them to pressure. The artificial stone will cause them to combine. It is desirable to make the grooves in the paper somewhat larger than the metal rods. The space which the metal does not occupy will then be filled with the stone compound, with the result of forming a rib reinforcement of stone and metal, giving increased protection to the metal and greatly stiffening the product. Stiffness is a highly desirable feature in all such materials. It is obvious that the compressing operation must be performed before the liquid form of stone sets or dries, and that it is possible to effect the union of the impregnated sheets by rotary mechanism—that is to say, by passing them through rolls having grooves to accommodate the metal rods or wires. It is also obvious that the wires may be made to cross one another in different directions, as at right angles, and that the metal may be formed in different shapes according to the purpose for which the product is designed.

From the foregoing description, it will be observed that the stone-treatment of the fibrous body gives stiffness and strength thereto, and by reason of the stone composition impregnating the said fibrous body, the walls of the ribs of such body inherently include stone reinforcement thereof, which may be increased or diminished as above indicated, according to the amount of stone composition which may be permitted to surround the ribs and fill into the grooves thereof.

A solution for forming the artificial stone consists of silicate of soda, infusorial earth and oxid of zinc. I have taken the ordinary silicate of soda of a syrupy consistency and diluted it with an equal quantity of water. To this I have added enough infusorial earth to make the solution of the consistency of ordinary mucilage, and then added from two to five per cent. of oxid of zinc. Finely ground sand or Portland cement may be substituted, in whole or in part, for the infusorial earth. The zinc is for the purpose of giving toughness to the finished product and it seems to hasten solidification. After effecting the combination of the metal, the paper and the stone, as already described, I treat the product in a bath of calcium chlorid for the purpose of rendering the stone compound insoluble, but I do not regard this treatment absolutely necessary. It is desirable to allow the impregnated paper to become at least partially dry, before bringing it into contact with the chlorid reagent and to wash the product by passing it through water after the chlorid treatment.

From the description herein, it is evident that the metal parts lie between what was previously two separate sheets of paper. The artificial stone solution, by going into the paper, causes the sheets particularly when under pressure to lose their identity, producing a body that has new characteristics. I have found it is practically impossible to separate the sheets when the operation is properly carried out, but, if by reason of imperfect practice, there develop any tendency to break, the break will occur in the seam, because the engagement of the fibers there, is not so extensive as in the body of the sheets. I provide for such contingency, as well as for other considerations, which are presently to be explained, by perforating the lathing material. By allowing the plaster to go through the body of the lath, the perforations will prevent absolutely any tendency to split. It is obviously important to bring the plaster into practically direct engagement with the reinforce ribs, and I effect this result, by making perforations adjacent the ribs, thus in effect establishing a holding engagement between the plaster and the metal, regardless of the paper and stone element. This result is facilitated by the tendency of the plaster to curl as it is pushed through the holes. It will be understood that I do not mean that it is necessary to make the perforations so close to the metal as to necessitate the stripping away of the composite material from the metal and actually exposing the metal. On the contrary it is desirable always to leave the metal protected.

Reference has hereinbefore been made to the importance of making the wall body as nearly homogeneous as practical. In short it is important to make the plaster the substantial part of the wall. It is well known that when plaster is applied to a solid body or to a flat even surface, the result is not as satisfactory as when it is applied to a broken and somewhat yielding substance. Therefore, it is highly desirable to break up the body of the material of the invention with numerous perforations, although plaster will readily stick to it without the aid of the holes. The perforations of course weaken the lathing, but it will be found that the material produced by combining the paper, stone and metal, as described, will be, when even as much as half of the body is thus cut away, still much stiffer than any known form of metallic lath, the thickness of the composite body being about the same as the diameter of the wire commonly used to form wire lath fabrics.

In the several illustrations, I have shown how the composite body formed of the stone and paper may be combined with metal to serve for other structural purposes.

Many efforts have been made to find a suitable and economical substitute for the wooden forms or molds, used in the installation of concrete floors. The custom is first to put in place, a false wooden floor to close the space between steel I beams. Steel rods, bars and steel in other shapes to provide for tensile stresses, are then placed on the wooden forms and the concrete poured over them, the woodwork being removed after the concrete has set and hardened. In Fig. 1 I show how the tension members may be combined with the composite material and no other form will be required to hold the concrete. In this figure A represents the paper and stone, B the tension member and C a cross rod of metal to brace the composite structure.

By Fig. 6 I illustrate how the article of the invention may be placed on the flanges of parallel I beams preparatory to the pouring of the concrete. It is obvious that it can be placed on the top of the I beams, to serve the same purpose when it is desired to arrange the floor above the beams.

In Fig. 2 I show a type in which the main metallic members consist of channels formed of sheet metal. These channels have been provided with holes through which rods C have been passed to strengthen the product.

Especially when the material is to be used in connection with the installation of concrete, I prefer to carry the treatment another step farther, by immersing the article in a solution of the same character described above, but preferably not so thick. The effect of this treatment is to superimpose on the stone impregnated paper, a coating of pure artificial stone. It will strengthen the article but lessen the flexibility which is a characteristic of the product.

I have designated paper as a material for combining with artificial stone, because it is the cheapest and most desirable form of fibrous material available. When of suitable quality it has capacity to absorb fluids and paper is easily manipulated. For that reason I prefer paper but I do not desire to limit the invention to it, since there are other fibrous materials that can be substituted. Of the paper products, sheets of ordinary unbleached wood pulp are well adapted for my purpose. Other compounds, too, besides the one I have named, are available for forming the artificial stone, this term being understood to include the well known cementitious substances which on drying or setting change from a plastic state into a hard crystalline body having qualities of stone.

In certain claims of this specification I have claimed a rib of stone reinforced with a rod of metal but I do not desire to be understood to mean that the major portion as would be shown in cross section must be stone. The greater portion of the cross sectional area of the ribs may be either metal or stone and the metal may be any desired shape in cross section.

What I claim and desire to secure by Letters Patent is:

1. As an article of manufacture, a structural element for buildings and the like comprising spaced metallic members, and a ribbed body of fibrous material in sheet form supporting said members, the fibrous material containing a permeant of artificial stone.

2. As an article of manufacture, a structural element for buildings and the like comprising spaced metallic members, and a ribbed body of fibrous material in sheet form supporting said members, some at least of the ribs having a filling of artificial stone.

3. As an article of manufacture, a structural element for buildings and the like, comprising a body of fibrous material in sheet form, having grooves therein forming ribs, and metallic rods in said grooves, the fibrous material having a permeant of artificial stone.

4. As an article of manufacture, a structural element for buildings and the like, comprising a body of fibrous material in sheet form, the said body having a rib reinforced by artificial stone and by a rod of metal.

5. As an article of manufacture, a structural element for buildings and the like, comprising a body of fibrous material in sheet form containing a permeant of artificial stone, the said body having a rib reinforced by artificial stone and by a rod of metal.

6. As an article of manufacture, a structural element for buildings and the like, comprising spaced metallic members and fibrous material in sheet form supporting said members and having its surface broken with perforations, both sides of said sheet material being coated with a layer of artificial stone to strengthening the structure to adapt it for supporting the metal, the layer on one side being connected with the layer on the opposite side by extensions of artificial stone through the said perforations, thus adapting the article to resist the swelling and warping effect of moisture when plaster is applied.

In witness whereof I have affixed my signature in the presence of two witnesses.

ALEXANDER P. WHITE.

Witnesses:
J. B. De Wolf,
M. Greenlees.